(12) United States Patent
Matsushita

(10) Patent No.: US 7,856,144 B2
(45) Date of Patent: Dec. 21, 2010

(54) IMAGE RETRIEVING APPARATUS, IMAGE RETRIEVING METHOD, PROGRAM, AND STORAGE MEDIUM

(75) Inventor: Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1227 days.

(21) Appl. No.: 11/441,100

(22) Filed: May 26, 2006

(65) Prior Publication Data

US 2006/0274081 A1 Dec. 7, 2006

(30) Foreign Application Priority Data

Jun. 3, 2005 (JP) .............................. 2005-164865
Mar. 13, 2006 (JP) .............................. 2006-068273

(51) Int. Cl.
G06K 9/46 (2006.01)
G06K 9/54 (2006.01)

(52) U.S. Cl. ......................... 382/190; 382/195; 382/305

(58) Field of Classification Search ................. 382/190, 382/195, 305; 503/227; 358/471, 518, 403, 358/527, 448; 430/204, 218, 487, 244, 494
See application file for complete search history.

(56) References Cited

U.S. PATENT DOCUMENTS 6,400,853 B1 * 6/2002 Shiiyama .................... 382/305
6,567,551 B2 5/2003 Shiiyama .................... 382/217
6,584,223 B1 6/2003 Shiiyama .................... 382/173
2006/0110073 A1 5/2006 Matsushita et al. .......... 382/305

FOREIGN PATENT DOCUMENTS

JP 11-288418 10/1999

* cited by examiner

Primary Examiner—Sheela C Chawan
(74) Attorney, Agent, or Firm—Fitzpatrick, Cella, Harper & Scinto

(57) ABSTRACT

An image retrieving apparatus that can suitably retrieve a similar image of image data whose density has changed. Image data is inputted from image input unit 12. Image feature amount extraction unit 14 divides normalized image data to plural regions, and extracts a feature amount in units of region. Feature amount label matrixing unit 15 generates a feature amount matrix. The feature amount matrix and image data are stored in image management DB 18 in association with each other. When query image data is designated, pattern matching unit 16 determines a similarity level between a feature amount matrix of the query image data and the feature amount matrix of the image data stored in the image management DB 18.

18 Claims, 15 Drawing Sheets

FIG. 4

| IMAGE ID | FULL-PASS FILE NAME | YET-TO-BE-NORMALIZED LABEL MATRIX | ALREADY-NORMALIZED LABEL MATRIX | OTHER ATTRIBUTES | ... |

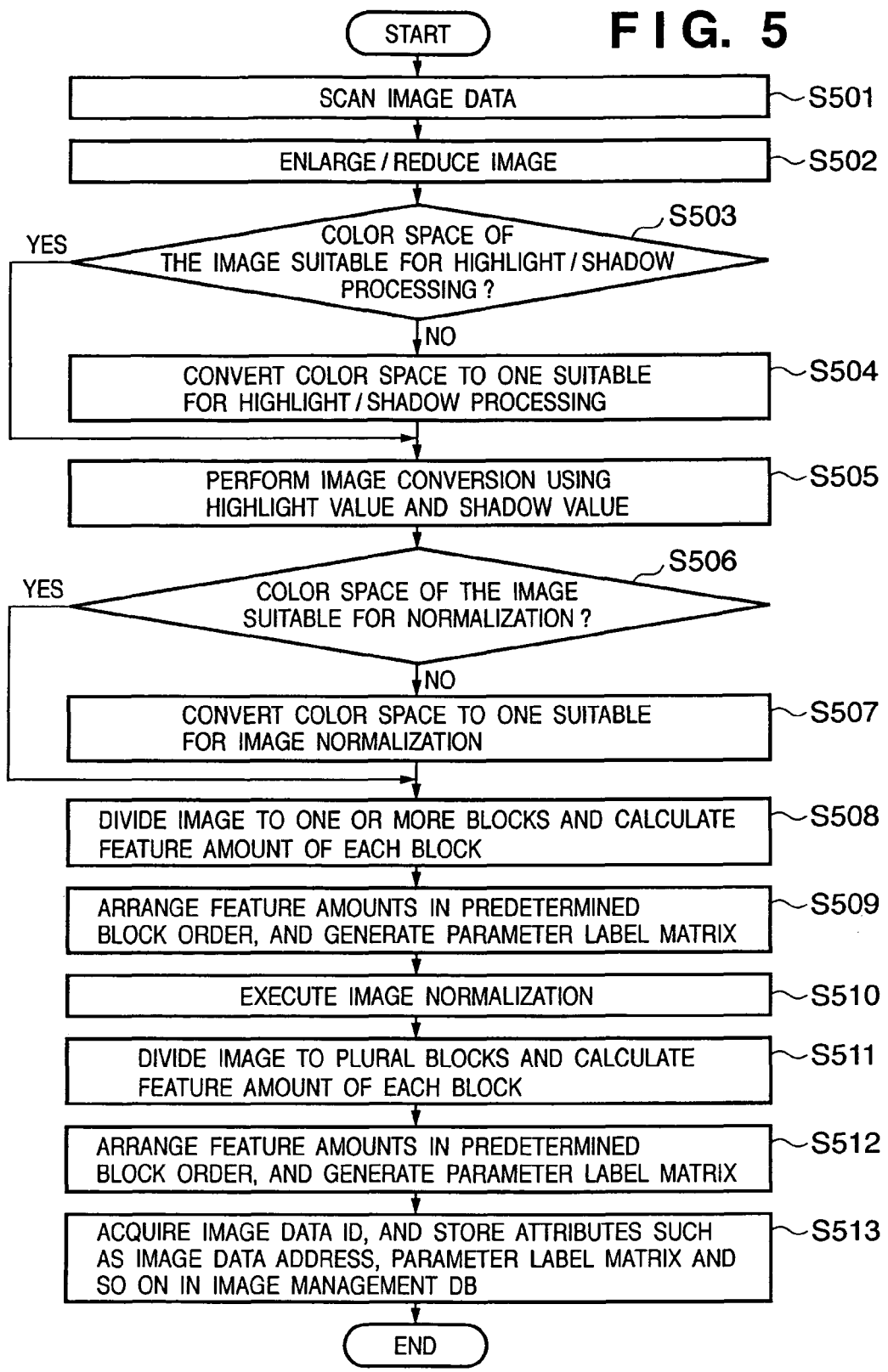

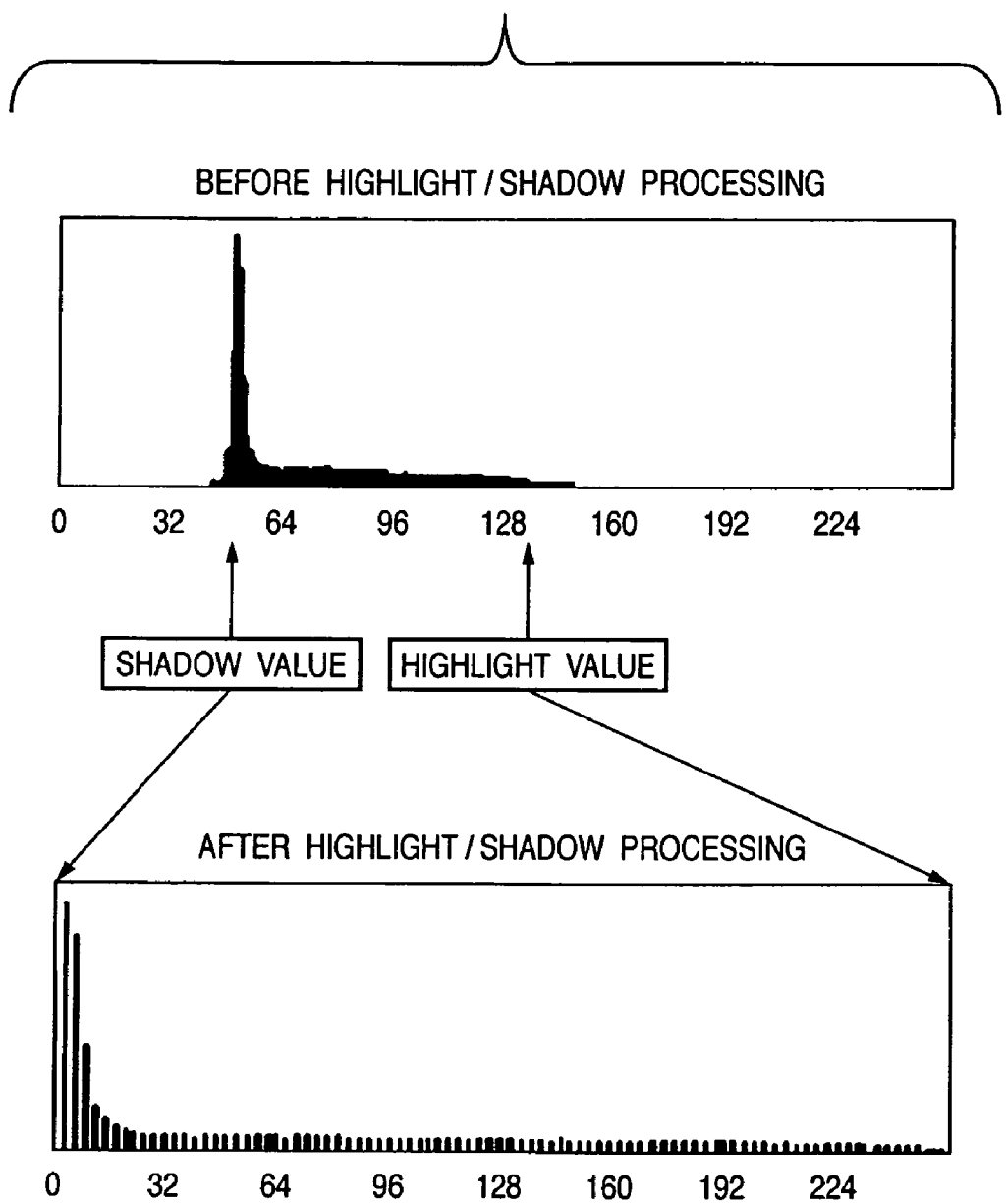

FIG. 10

| 1 | 2 | 3 |
|---|---|---|
| 4 | 5 | 6 |
| 7 | 8 | 9 |

FIG. 12

|   | 1 | 2 | 3 | 4 | 5 | 6 | 7 | 8 | ..... |
|---|---|---|---|---|---|---|---|---|-------|
| 1 | 0 | 1 | 1 | 5 | 1 | 5 | 7 | 7 | ..... |
| 2 |   | 0 | 2 | 1 | 1 | 7 | 2 | 5 | ..... |
| 3 |   |   | 0 | 7 | 1 | 1 | 5 | 2 | ..... |
| 4 |   |   |   | 0 | 1 | 9 | 1 | 7 | ..... |
| ⋮ |   |   |   |   |   |   |   |   |       |

IMAGE RETRIEVING APPARATUS, IMAGE RETRIEVING METHOD, PROGRAM, AND STORAGE MEDIUM

FIELD OF THE INVENTION

The present invention relates to an image retrieving apparatus, an image retrieving method, a program, and a storage medium for retrieving an image whose colors have changed due to printing or scanning, or for retrieving an original image based on an image whose colors have changed due to printing or scanning.

BACKGROUND OF THE INVENTION

Conventionally various techniques have been proposed for retrieving similar images. For instance, in the techniques that are put in practical use to some extent for retrieving similar images with respect to photograph images, most techniques use color data as an image feature amount. Further, most techniques take a histogram regarding color data and perform image retrieval based on an RGB ratio as well as a combination of colors that exist a lot in the image. However, in such techniques, since color position data is lost, the retrieval accuracy is not necessarily high.

A similar image retrieving method that takes a layout of image feature amounts into consideration has been disclosed (Japanese Patent Application Laid-Open No. 11-288418). This method has achieved some improvement on retrieving an image having a difference in color layout.

Meanwhile, the following system has been conceived for comparing original image data with a paper image where image data has been printed on paper (hereinafter referred to as a paper image).

Conventionally, when a document is to be generated using a paper image, the paper image is scanned and converted to image data, and then the image data is pasted on a document. Moreover, when a printed paper image is to be copied, the paper image is copied (i.e., scanned and printed) by a copying machine. However, in general, printing image data causes image quality deterioration and color changes when compared to original image data. Similarly, scanning a paper image and converting it to image data also causes image quality deterioration and color changes when compared to the paper image.

These phenomena take place because the color gamut used by the original image data, the color gamut that can be outputted by a printer, and the color gamut that can be scanned by a scanner do not completely match. In order to suppress such image quality deterioration and color changes as much as possible and to generate an excellent-quality document or copy, it is necessary to reduce the system of printing and scanning as much as possible. More specifically, when image data is to be pasted on a document, original image data has to be pasted; and when an image is to be copied, original image data has to be printed. For this purpose, an original image data retrieving technique is necessary.

For another example, a system applied to data management has been conceived. In this system, printed image data, scanned image data, copied image data and the like are registered in a database along with information such as date and time, a user name and the like. Then, the date and time of printing, scanning or copying, and a user name of certain image data are inputted for a search. In such system, a technique is necessary to retrieve image data, obtained by scanning a paper image, based on an original image.

However, since the conventional image retrieving method strictly compares differences in colors, retrieval accuracy is not necessarily high in quality-deteriorated and color-changed images.

SUMMARY OF THE INVENTION

The present invention has been proposed in view of the above-described situation, and is provided to suitably execute image retrieval that is tolerant to image quality deterioration and color changes.

According to the present invention, the foregoing object is attained by providing an image retrieving apparatus comprising:

an input unit that inputs an image;

a normalization unit that generates a normalized image by normalizing the image;

a generation unit that generates a feature amount matrix by dividing the normalized image to plural regions and extracting a feature amount in units of region;

a storage unit that stores the feature amount matrix and the image in association with each other;

a designation unit that designates a query image;

a determination unit that determines a similarity level between a feature amount matrix of the query image and a feature amount matrix of the image stored in the storage unit; and a retrieval unit that retrieves an image, which is determined to be similar by the determination unit, as a similar image of the query image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute part of the specification, illustrate embodiments of the invention and, together with the description, serve to explain the principles of the invention.

FIG. 4 is an explanatory view of an image data storage state in an image management database (DB) 18 according to an embodiment of the present invention;

FIG. 5 is a flowchart describing a procedure of image registration processing of the image retrieving apparatus according to an embodiment of the present invention;

FIG. 6 is a chart explaining highlight/shadow processing of the image retrieving apparatus according to an embodiment of the present invention;

FIG. 10 is an explanatory view of a region order employed in generating a label matrix according to an embodiment of the present invention;

FIG. 12 is a view showing an example of a penalty matrix between labels, employed to obtain a similarity level by comparing label matrices in step S1105;

DETAILED DESCRIPTION OF THE PREFERRED EMBODIMENTS

Preferred embodiments of the present invention will now be described in detail in accordance with the accompanying drawings. It should be noted that the relative arrangement of the components, the numerical expressions and numerical values set forth in these embodiments do not limit the scope of the present invention unless it is specifically stated otherwise.

Note that the present embodiment describes a case where a feature amount is expressed by a label.

Figure 1:
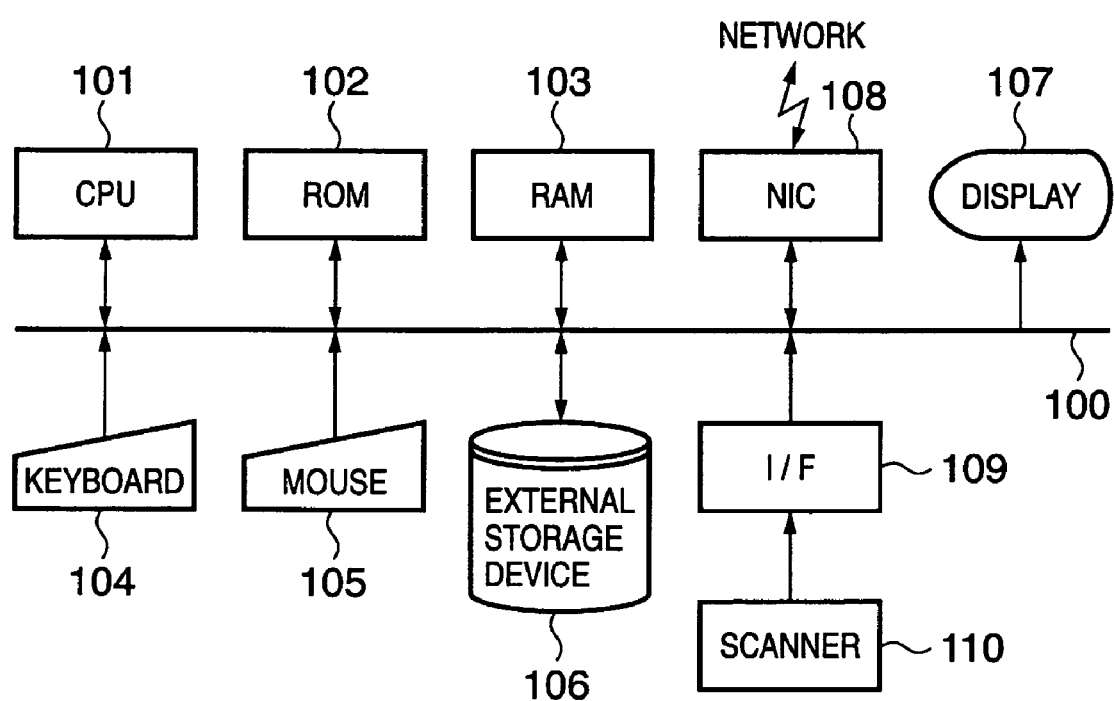
FIG. 1 is a block diagram showing a control structure of an image retrieving apparatus according to an embodiment of the present invention.

FIG. 1 is a block diagram showing a control structure of an image retrieving apparatus according to an embodiment of the present invention. In FIG. 1, numeral 101 denotes a CPU that executes various controls in the image retrieving apparatus according to the present embodiment. Numeral 102 denotes ROM for storing various data and a boot program executed upon startup of the image retrieving apparatus. Numeral 103 denotes RAM for storing a control program executed by the CPU 101. The RAM 103 also provides a working area when the CPU 101 executes various controls. Numeral 104 denotes a keyboard, and 105 denotes a mouse for providing a user with various input operation environments.

Numeral 106 denotes an external storage device configured with a hard disk, a flexible disk, CD-ROM and the like. Numeral 107 denotes a display that displays processing contents and results on a screen to notify a user. Numeral 108 denotes a network interface that enables communication with various devices on a network. Numeral 110 denotes a scanner for scanning an image. Numeral 109 denotes an interface for connecting the scanner 110 with the above-described respective components. Numeral 100 denotes a bus for mutual connection of the above-described respective components.

Note, in the above construction, the scanner 110 and the external storage device 106 may be substituted with other devices provided on the network.

Figure 2:
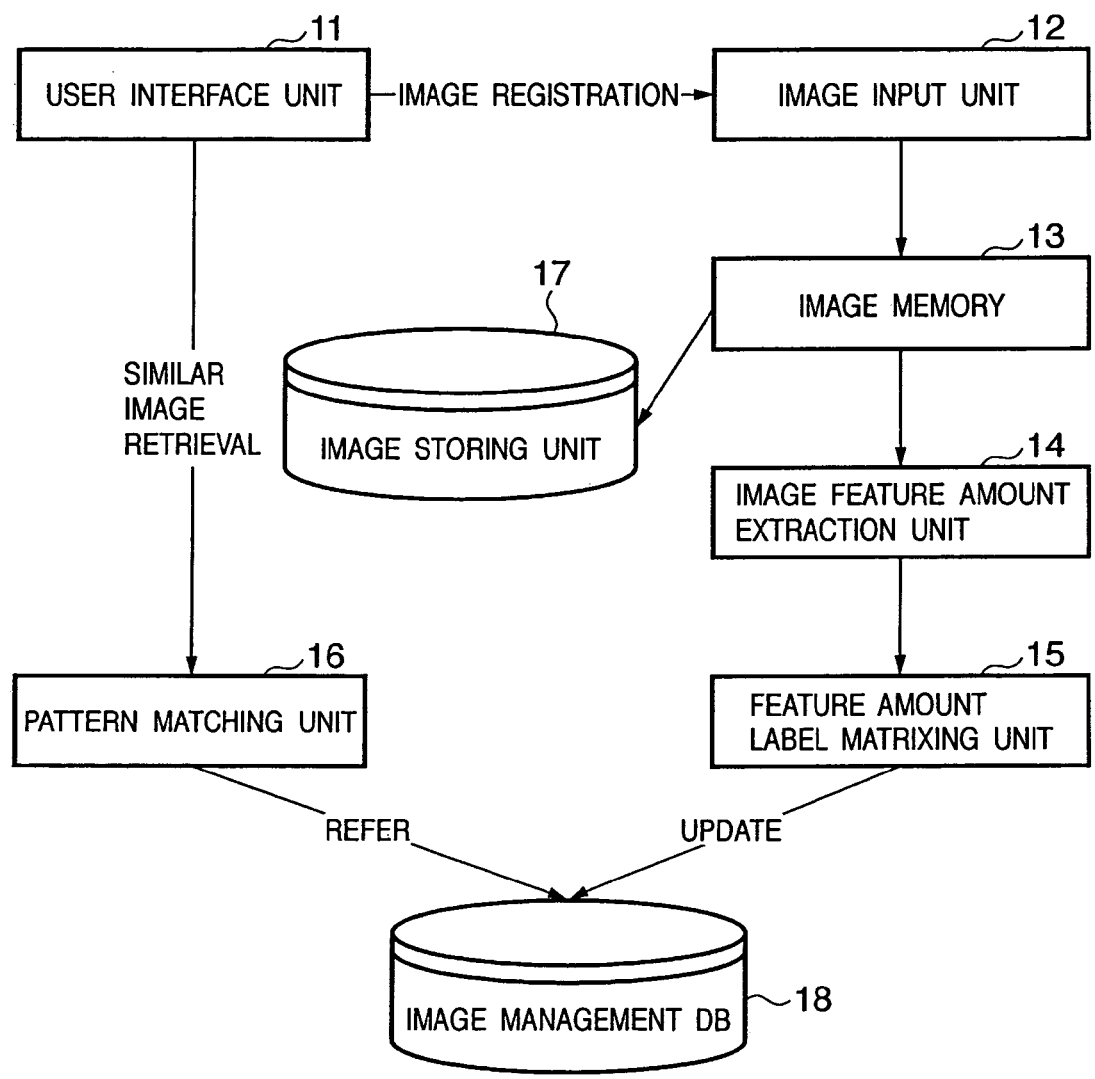
FIG. 2 is a block diagram showing a functional structure of an image retrieving apparatus according to an embodiment of the present invention.

FIG. 2 is a block diagram showing a functional structure of the image retrieving apparatus according to an embodiment of the present invention. In FIG. 2, numeral 11 denotes a user interface unit where various operation inputs from a user are detected using the display 107, the keyboard 104, and the mouse 105 shown in FIG. 1. Numeral 12 denotes an image input unit where image scanning is performed by the scanner 110. Numeral 13 denotes an image memory for storing image data obtained by the image input unit 12 in a predetermined area of the RAM 103. Numeral 14 denotes an image feature amount extraction unit that extracts a feature amount of an image stored in the image memory 13 according to a procedure which will be described later. Numeral 15 denotes a feature amount label matrixing unit that generates a label matrix based on the feature amount obtained by the image feature amount extraction unit 14. Numeral 16 denotes a pattern matching unit that calculates a similarity level between a label matrix of a designated image and a label matrix of an image reserved in an image storing unit 17 according to a procedure which will be described later.

Figure 3:
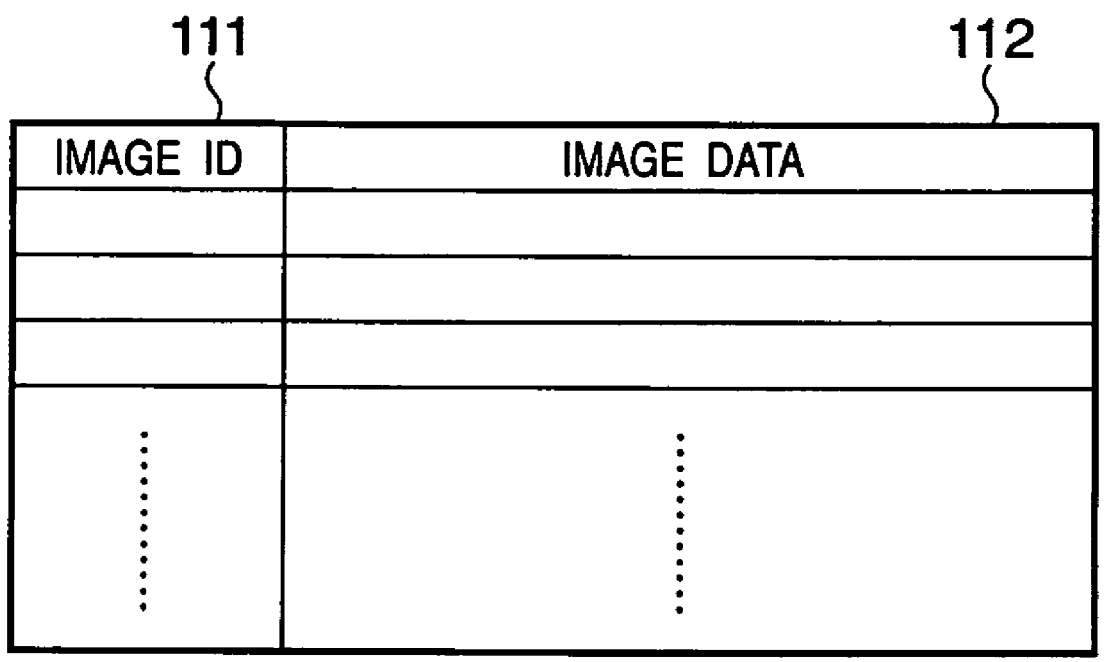
FIG. 3 is an explanatory view of an image data storage state in an image storing unit 17.

Further, in FIG. 2, numeral 17 denotes an image storing unit that reserves image data obtained by the image input unit 12 or the like. FIG. 3 is an explanatory view of an image data storage state in the image storing unit 17. As shown in FIG. 3, an image ID 111 is given to each image data 112, and the ID 111 and the image data 112 are stored in pairs in the image storing unit 17. Further in FIG. 2, numeral 18 denotes an image management database (hereinafter referred to as an image management DB) that manages image data stored in the image storing unit 17 in the data form shown in FIG. 4. FIG. 4 is an explanatory view of an image data storage state in the image management DB 18 according to an embodiment of the present invention. According to the embodiment, an image ID, a full-pass file name, a label matrix of an yet-to-be-normalized feature amount, a label matrix of an already-normalized feature amount, other attributes and the like are stored in units of image data in the image management DB 18 as shown in FIG. 4.

An operation example of the image retrieving apparatus having the above-described construction will now be described.

First Embodiment

<Image Registration Processing>

Described first is image registration in the image retrieving apparatus according to the present embodiment.

FIG. 5 is a flowchart describing a procedure of image registration in the image retrieving apparatus according to an embodiment of the present invention. First, in accordance with a user instruction via the user interface unit 11, an image is scanned by the image input unit 12, and the scanned image data is stored in the image memory 13 (step S501). The image is enlarged or reduced to a predetermined size (step S502). Performing enlargement or reduction of an image enables to remove to some extent halftone dots, moiré and the like existing in the scanned image. Furthermore, image reduction is effective from the aspect of speeding up the highlight/shadow setting, color space conversion, image normalization, and feature amount extraction which will be described later.

Next, highlight/shadow processing is performed (steps S503 to S505). In a case of scanning a paper image, the scanning is often performed so as to keep tonality of the paper image so that black tones and white tones are not easily lost. Because of this, scanned image data undesirably includes the color of paper used in printing or a shadow or the like caused by the original document being lifted from the platen glass of the scanner. Therefore, the portion where nothing is printed does not come out all white. Also, the portion printed with all black does not come out all black, because toner or glossy paper reflects light. In the highlight/shadow processing, the portion that is assumed to be all black or all white in the original image data is converted to all black or all white.

First, it is determined whether the color space of the image is suitable for highlight/shadow processing (step S503). If the color space is not suitable for highlight/shadow processing, the color space is converted to one that is suitable for highlight/shadow processing (step S504). As mentioned above, in highlight/shadow processing, the portion close to white is converted to white and the portion close to black is converted to black. Therefore, color space suitable for this processing is the color space where white exists opposite to black. That is, RGB color space, CMY color space, or CMYK color space is suitable for highlight/shadow processing. Since normally used images are RGB color space images, RGB color space is adopted as the color space used in highlight/shadow processing as it eliminates the necessity of color space conversion and contributes to expediting the process. In a case of an environment where many images employ CMY color space or CMYK color space, such as a design office or the like where jobs are directly related to printing, the CMY color space or CMYK color space is adopted as the color space used in highlight/shadow processing for better efficiency.

Next, occurrence frequencies are added from the highlight side of a histogram of the stored image, and the portion exceeding a fixed rate is decided as a highlight value. Similarly, occurrence frequencies are added from the shadow side of the histogram of the image, and the portion exceeding a fixed rate is decided as a shadow value. Using these values, image conversion is performed in the following procedure (step S505).

First, a conversion table Conv1 (i) (i=0, 1, 2, ..., 255) for image conversion is generated using equation (1). Herein, the highlight value and the shadow value are respectively represented by HL and SD.

$$Conv1(i) = \begin{cases} 0 & \text{(when } 0 \leq i \leq SD) \\ (i - SD) \times \dfrac{255}{HL - SD} & \text{(when } SD < i < HL) \\ 255 & \text{(when } HL \leq i \leq 255) \end{cases} \quad (1)$$

Next, all pixels of the image data is converted using the conversion table Conv1 (i). FIG. 6 is a chart explaining highlight/shadow processing of the image retrieving apparatus according to an embodiment of the present invention. Referring to FIG. 6, the image before highlight/shadow processing has a histogram shown in FIG. 6, and the image after highlight/shadow processing has a histogram shown in FIG. 6.

Next, image normalization is performed (steps S506, S507, S510). Since the color gamut of original image data is different from the color gamut that can be outputted by a printer, gamut mapping is performed before printing image data. Also, since the color gamut outputted by a printer is different from the color gamut that can be scanned by a scanner, gamut mapping is performed before scanning a paper image. By gamut mapping, colors that cannot be used are converted to substitute colors.

Gamut mapping is performed in the color space called isochromatic color space such as L*a*b* or JCh. Typical methods of gamut mapping include: a method that stores brightness, a method that minimizes color difference, and a method that stores relative relations. In any of these methods, on the color space where gamut mapping is performed, the small and large of the component values constituting the color space are never inverted. In the normalization processing, normalization is performed in a way that an average value becomes a predetermined value and the small and large of the component values for each component constituting the color space are not inverted. As a result, the image data is converted to data where color data is less emphasized but contrast data is emphasized.

First, it is determined whether the color space of the image is suitable for image normalization (step S506). If the color space is not suitable for image normalization, the color space is converted to one that is suitable for image normalization (step S507). As mentioned above, image normalization is processing for emphasizing contrast data of an image whose colors have changed due to gamut mapping. Therefore, color space suitable for this processing is the color space where gamut mapping is performed or the color space having a similar characteristic. That is, color space called isochromatic color space such as L*a*b* or JCh is suitable for image normalization.

Figure 8:
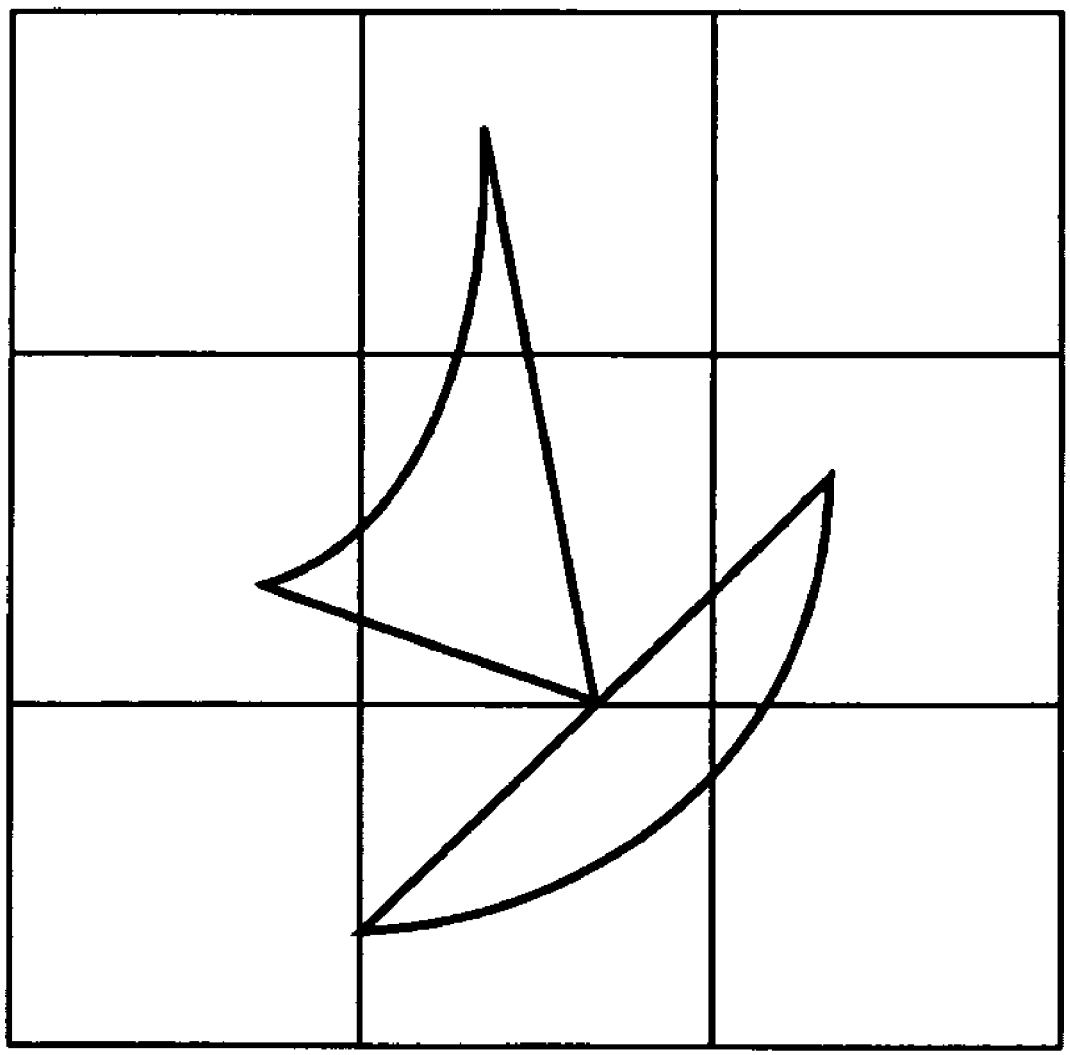
FIG. 8 is a view showing an example of region division in the image retrieving apparatus according to an embodiment of the present invention.

Next, a feature amount before image normalization (hereinafter referred to as an yet-to-be-normalized image feature amount) is extracted (step S508). The image is divided to one or more regions (blocks). In the present embodiment, the image is divided to vertical and horizontal regions (blocks). FIG. 8 shows an example of region division in the image retrieving apparatus according to an embodiment of the present invention. As shown in FIG. 8, the image is divided to 3×3 regions, i.e., a total of 9 regions, in this embodiment. Next, a feature amount of each divided region is calculated, and the obtained feature amount is labeled in the following procedure.

Note that the division to 3×3 regions employed in the present embodiment is provided entirely for the purpose of explanation. Although details will be described later in image retrieval processing, the image normalization processing is used as a pre-search. Because color data is less emphasized by image normalization, this processing is purposed to screen out images having completely different colors. The larger the feature amount, the slower the processing speed. Therefore, considering the nature of pre-search, many number of division is not necessary. In some cases, acquiring one feature amount from an entire image without performing region division may be sufficient.

Figure 9:
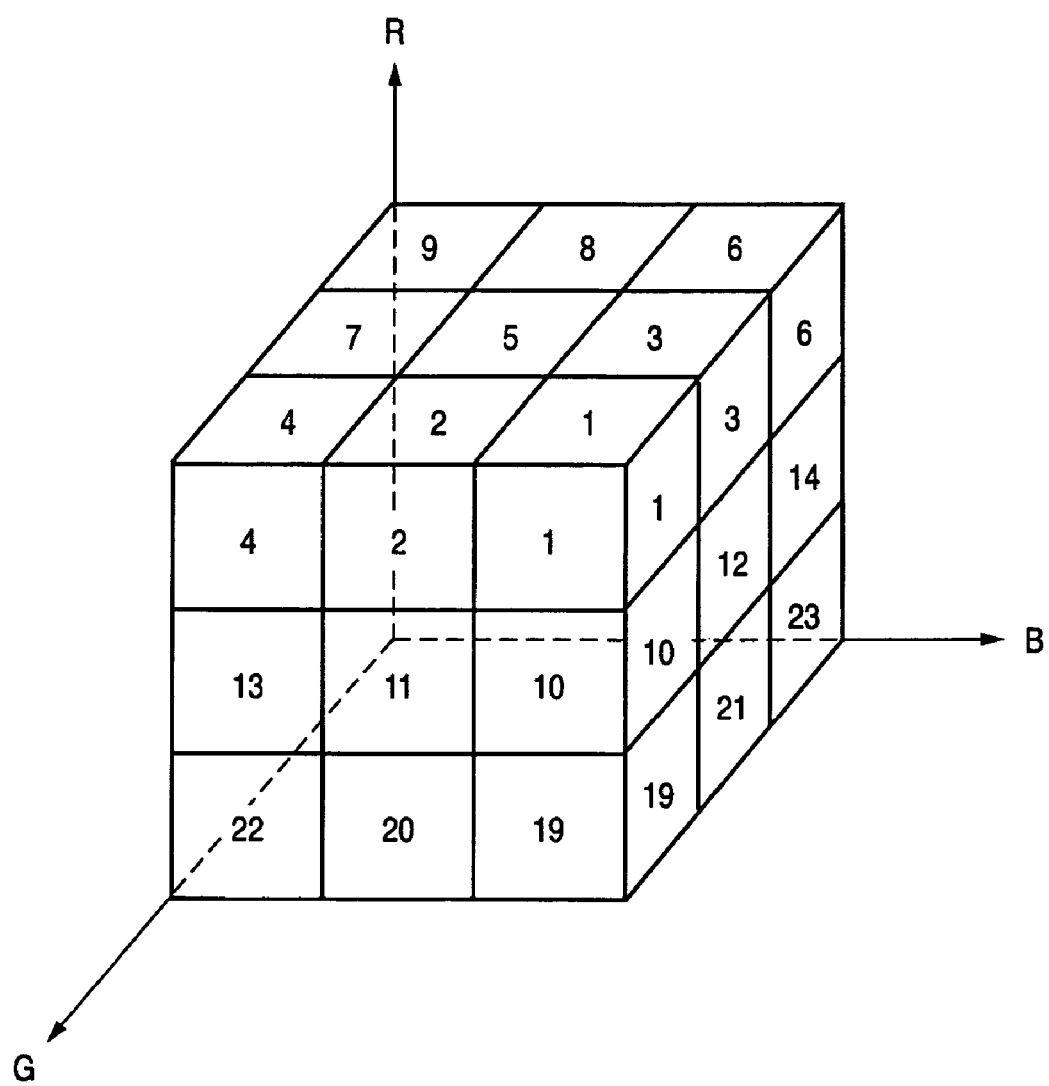
FIG. 9 is an explanatory view of multi-dimensional feature amount space according to an embodiment of the present invention.

FIG. 9 is an explanatory view of multi-dimensional feature amount space according to an embodiment of the present invention. As shown in FIG. 9, the multi-dimensional feature amount space (L*a*b* color space) is divided to plural blocks (color blocks), i.e., cells (color cells), and unique labels having serial numbers are given to respective cells (color cells). Herein, the reason of dividing the multi-dimensional feature amount space (L*a*b* color space) to plural blocks is to absorb a subtle difference in the feature amount (color). To emphasize color components, L*×a*×b* may be divided to 3×5×5. To emphasize luminance components, L*×a*×b* may be divided to 5×3×3.

Predetermined image feature amount calculation is performed with respect to each of the divided regions, and a cell of the multi-dimensional feature amount space the region belongs is obtained to find a corresponding label. This processing is performed for all regions. More specifically, with respect to a divided image region, an average value of all pixel values is obtained. Calculation is performed to find a color cell the region belongs. Then, the corresponding label is decided as a parameter label (color label) of the divided image region. This processing is performed with respect to all regions.

Figure 10:
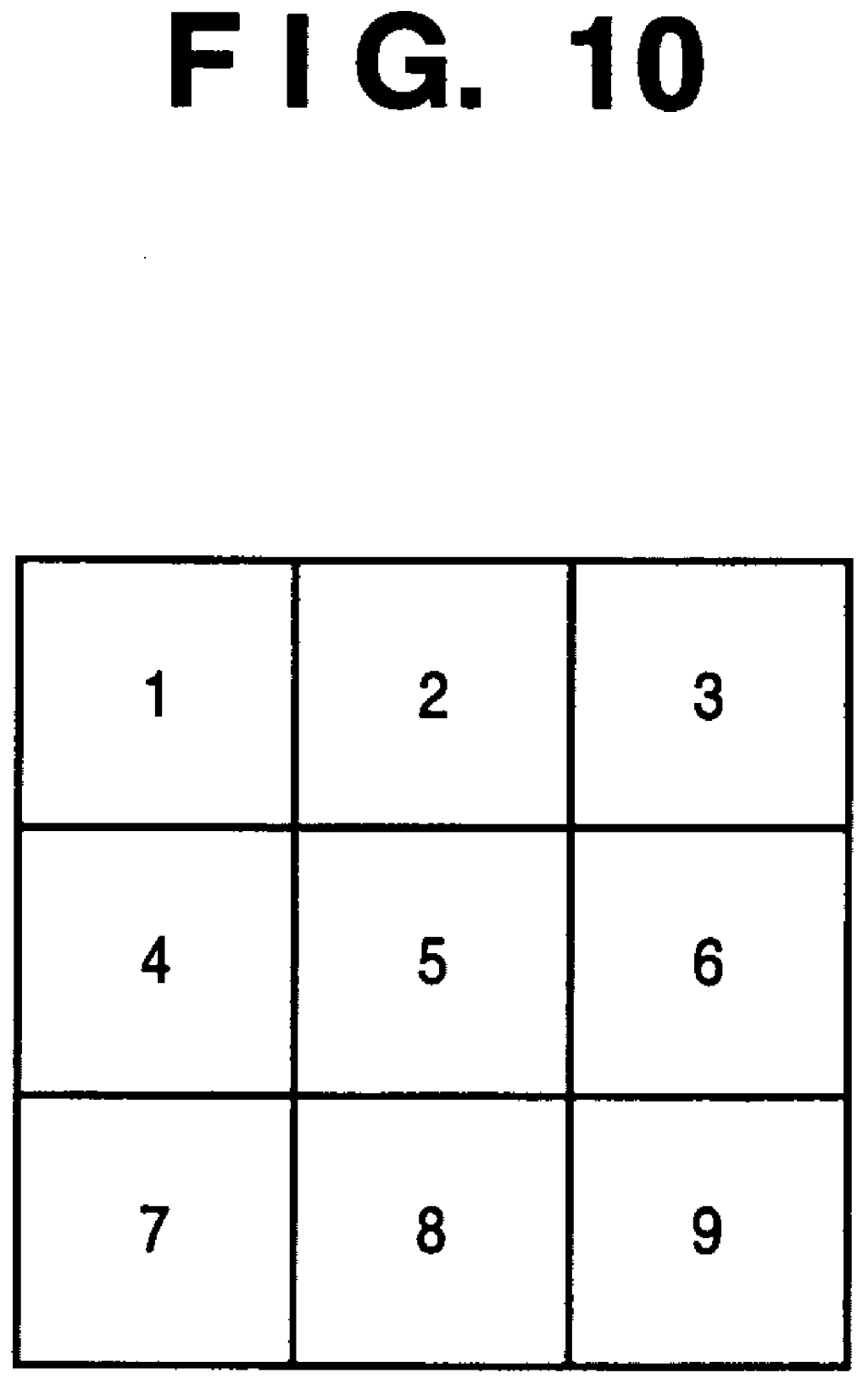

After a parameter label is provided to each region in the foregoing manner, the parameter labels provided to respective regions are arranged in a predetermined region order, thereby generating a parameter label matrix (hereinafter referred to as a label matrix) (step S509). FIG. 10 is an explanatory view of a region order employed in generating a label matrix according to an embodiment of the present invention. In this embodiment, the aforementioned parameter labels are arranged in accordance with the numbers shown in the divided image regions in FIG. 10, and a label matrix is generated. Note that when the label matrix is stored in the image management DB 18, as mentioned above, the two-dimensional label matrix is arranged into a one-dimensional matrix in a predetermined order and stored. In the present embodiment, such matrix in one-dimensional form is also referred as a label matrix.

Next, image normalization is performed (step S510). Image normalization methods include: a method of uniformizing average values by shifting pixel values, a method of uniformizing average values by performing scaling conversion on pixel values, a method of uniformizing average values by performing equalization of a histogram, and so on. In the present embodiment, average values are uniformized by performing equalization of a histogram. Equalization of a histogram is performed in the following procedure.

Figure 7A:
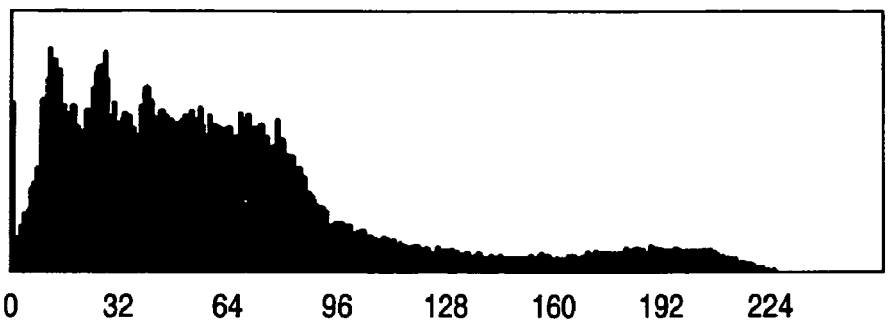
FIGS. 7A to 7C are explanatory views of histogram equalization processing in the image retrieving apparatus according to an embodiment of the present invention.
Figure 7B:
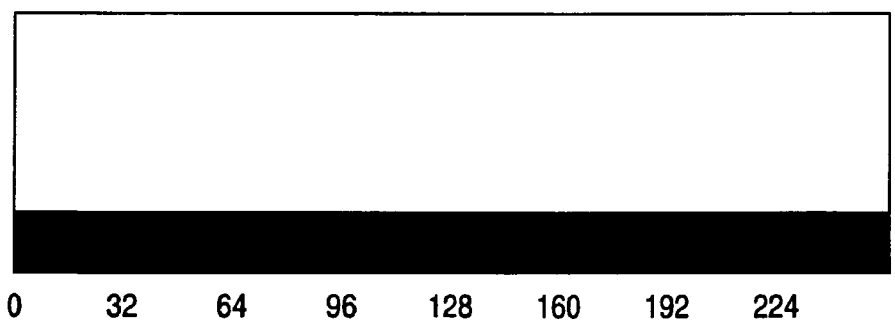
Figure 7C:
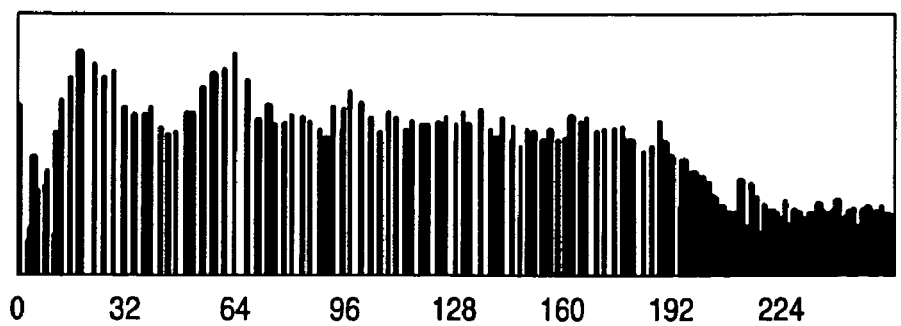

First, a histogram Hist (i) (i=0, 1, 2, . . . , 255) of an image before conversion is generated. Then, an occurrence frequency of a pixel value i is stored in Hist (i). At the same time, the sum (SUM) of the densities of all pixels is calculated. FIGS. 7A to 7C are explanatory views of histogram equalization processing in the image retrieving apparatus according to an embodiment of the present invention. FIG. 7A shows Hist (i) in a graph.

Next, to generate a histogram where occurrence frequencies of all densities are substantially uniform, a conversion table Conv2 (i) (i=0, 1, 2, . . . , 255) is generated. In this processing, occurrence frequencies are added sequentially from Hist (0). Defining that i obtained when the sum exceeds Sum/255 is k1, the values from Conv2 (0) to Conv2 (k1) are obtained as k1. Next, occurrence frequencies are added sequentially from Hist (k1+1). Defining that i obtained when the sum exceeds Sum/255 is k2, the values from Conv2 (k1+1) to Conv2 (k2) are obtained as k2. In the similar manner, calculation is performed up to Conv2 (255).

Finally, all pixels of the image data are converted using the conversion table Conv2 (i). The ideal shape of the histogram after equalization is shown in FIG. 7B. However, in reality, the graph does not completely become flat, but normally has a shape like the graph shown in FIG. 7C.

Next, a feature amount after image normalization (hereinafter referred to as an already-normalized image feature amount) is extracted (step S511). The image is divided to plural regions, a feature amount of each of the divided regions is calculated, and the obtained feature amount is labeled. The region dividing method and the labeling method are similar to the above-described region division and labeling performed at the time of extracting a yet-to-be-normalized image feature amount.

In the present embodiment, the image is divided to vertical and horizontal 3×3 regions, i.e., a total of 9 regions. However, the division to 3×3 regions employed in the present embodiment is provided entirely for the purpose of explanation. In reality, the number of division is preferably 10×10 regions or more in a case of a photograph image. In a case of an image where a commercial product is placed on a plain background, the number of division is preferably 13×13 regions or more.

The label matrix and image data obtained in the foregoing manner are stored in the image storing unit 17 and the image management DB 18 (step S513). More specifically, an image ID is acquired for the image data scanned in step S501, and the image and the ID are stored in pairs in the image storing unit 17. An image management DB record shown in FIG. 4 is generated in correspondence with the image ID, and registered in the image management DB 18.

The foregoing processing is performed in image registration.

<Similar Image Retrieval Processing>

Figure 11:
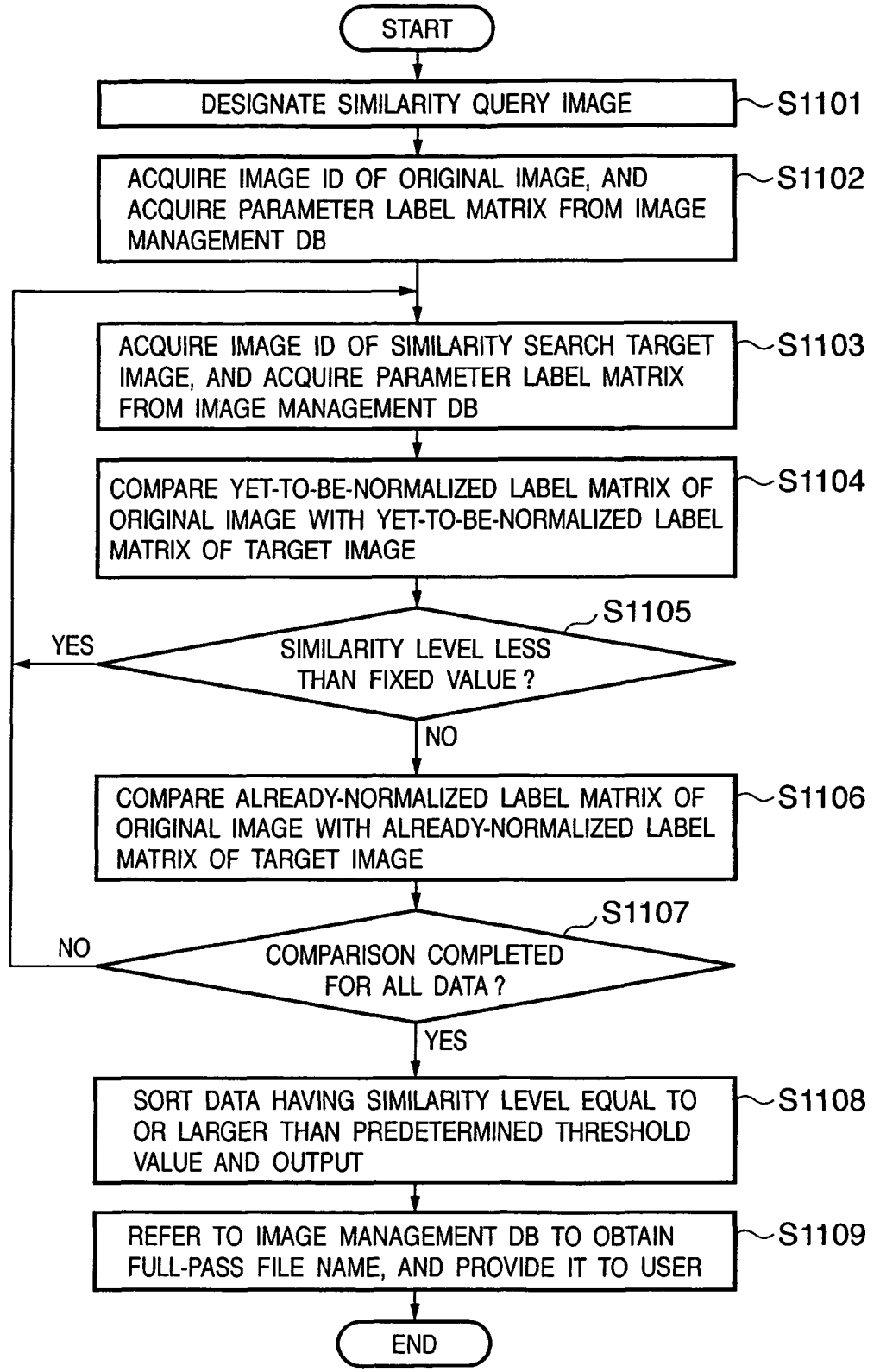
FIG. 11 is a flowchart describing a procedure of similar image retrieval processing performed by the image retrieving apparatus according to an embodiment of the present invention.

Next, similar image retrieval processing is described in accordance with the flowchart in FIG. 11. FIG. 11 is a flowchart describing a procedure of similar image retrieval processing performed by the image retrieving apparatus according to an embodiment of the present invention.

First, a user designates a query image from the user interface unit 11 (step S1101). In response, the image retrieving apparatus acquires an image ID of the designated original image, and acquires from the image management DB 18 an yet-to-be-normalized label matrix (in this embodiment, color label matrix) of the original image (step S1102). Similarly, the image retrieving apparatus acquires a yet-to-be-normalized label matrix and an already-normalized label matrix of a similarity search target image (step S1103).

Next, the image retrieving apparatus compares the yet-to-be-normalized label matrix of the original image with the yet-to-be-normalized label matrix of the target image (step S1104).

Figure 12:
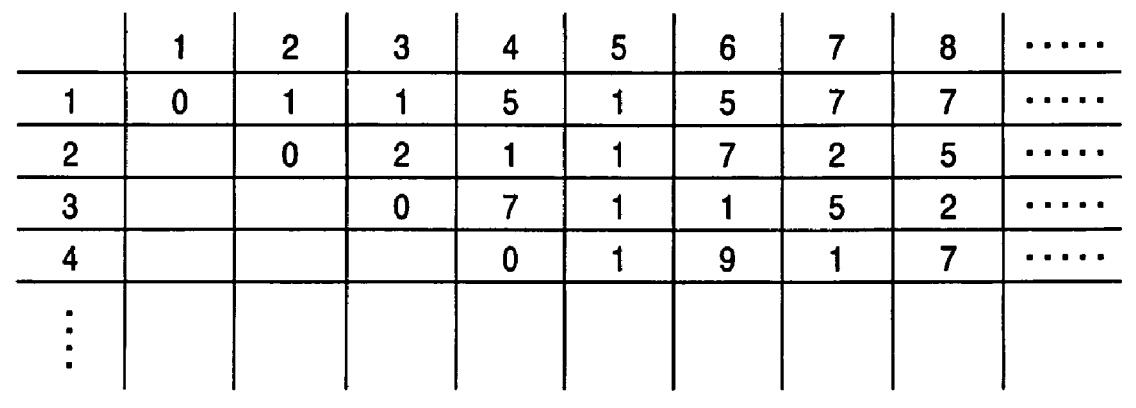

Herein, a similarity comparison method (calculation of similarity levels) of label matrices is described. FIG. 12 is a view showing an example of a penalty matrix between labels, employed for obtaining a similarity level by comparing label matrices in step S1104. In FIG. 12, the smaller the value in the matrix, the higher the similarity level.

For instance, the penalty of label 2 and label 6 is "7." The penalty of the identical labels is naturally "0." The purpose of using this matrix is to perform distance determination that corresponds to label similarity. In other words, in the present embodiment where L*a*b* color space is used for feature amount space, distance determination corresponding to color similarity can be realized.

Figure 13:
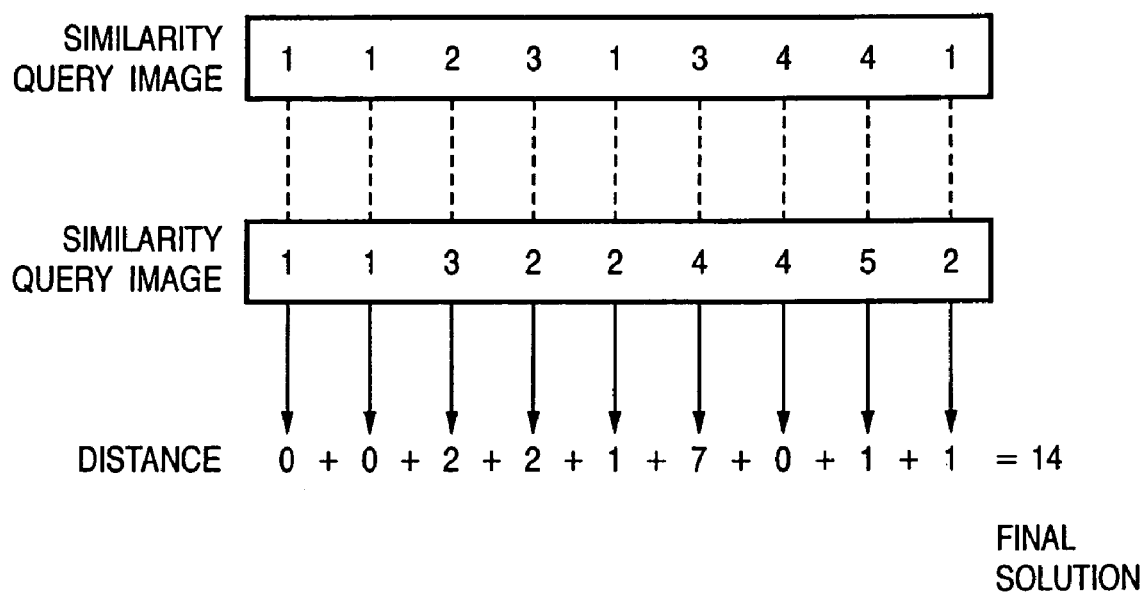
FIG. 13 is an explanatory view of distance calculation between label matrices using matching according to an embodiment of the present invention.

For instance, based on values of the labels at the corresponding positions of the label matrices of the original image and the target image, a distance is obtained by referring to the penalty matrix in FIG. 12. By calculating the sum of the distances with respect to all labels of the label matrices, a distance between the two label matrices is obtained. For instance, in the example shown in FIG. 13, the label matrix of the original image is "112313441" and the label matrix of the target image is "113224452." By performing matching using the penalty matrix in FIG. 12, a distance (final solution) is obtained. FIG. 13 is an explanatory view of distance calculation between label matrices using matching according to an embodiment of the present invention.

As described above, the penalty matrix between labels shown in FIG. 12 is introduced so that, in pattern matching between labels, a small penalty (distance) is given to adjacent cells and a large penalty is given to distant cells. In step S1104, this penalty matrix is taken into consideration and label matrices are compared.

In a case where region division is not performed at the time of acquiring the yet-to-be-normalized feature amount, a similarity level can be obtained by simply calculating a difference; thus, extremely high-speed processing is possible.

As a result, if the similarity level is equal to or larger than a fixed value (NO), a similarity level is calculated by comparing the already-normalized label matrix of the original image with the already-normalized label matrix of the target image (step S1106). In step S1107, processing from steps S1103 to S1106 are performed for all registered data. Meanwhile, in a case where the similarity level is less than the fixed value in step S1105, it is determined that there is no similarity between the original image data and the target image data. Then the control returns to step S1103 and shifts to comparison with the next image data.

The similarity comparison (calculation of similarity levels) between the already-normalized label matrices can be performed in the similar manner to the similarity comparison between the yet-to-be-normalized label matrices.

In step S1108, the obtained similarity levels are sorted in descending order, and the control proceeds to step S1109. In step S1109, the image management DB 18 is referred to acquire a full-pass file name with respect to each of the image IDs, and the acquired file name is provided to the user.

Although the present embodiment performs similarity search by expressing a feature amount with labels, a similarity search method executed without labeling a feature amount can easily be presumed from the above-described method.

As described above, according to the present embodiment, it is possible to suitably execute image retrieval that is tolerant to image quality deterioration and color changes. In particular, it is possible to retrieve original image data based on image data where colors and densities have changed upon scanning printed image data, or based on image data where tones of the shadow and highlight portions are not accurately reproduced and where black portions are whitish or white portions are blackish.

Second Embodiment

<Image Registration Processing>

Image registration according to the second embodiment is similar to that of the first embodiment.

<Similar Image Retrieval Processing>

Figure 15:
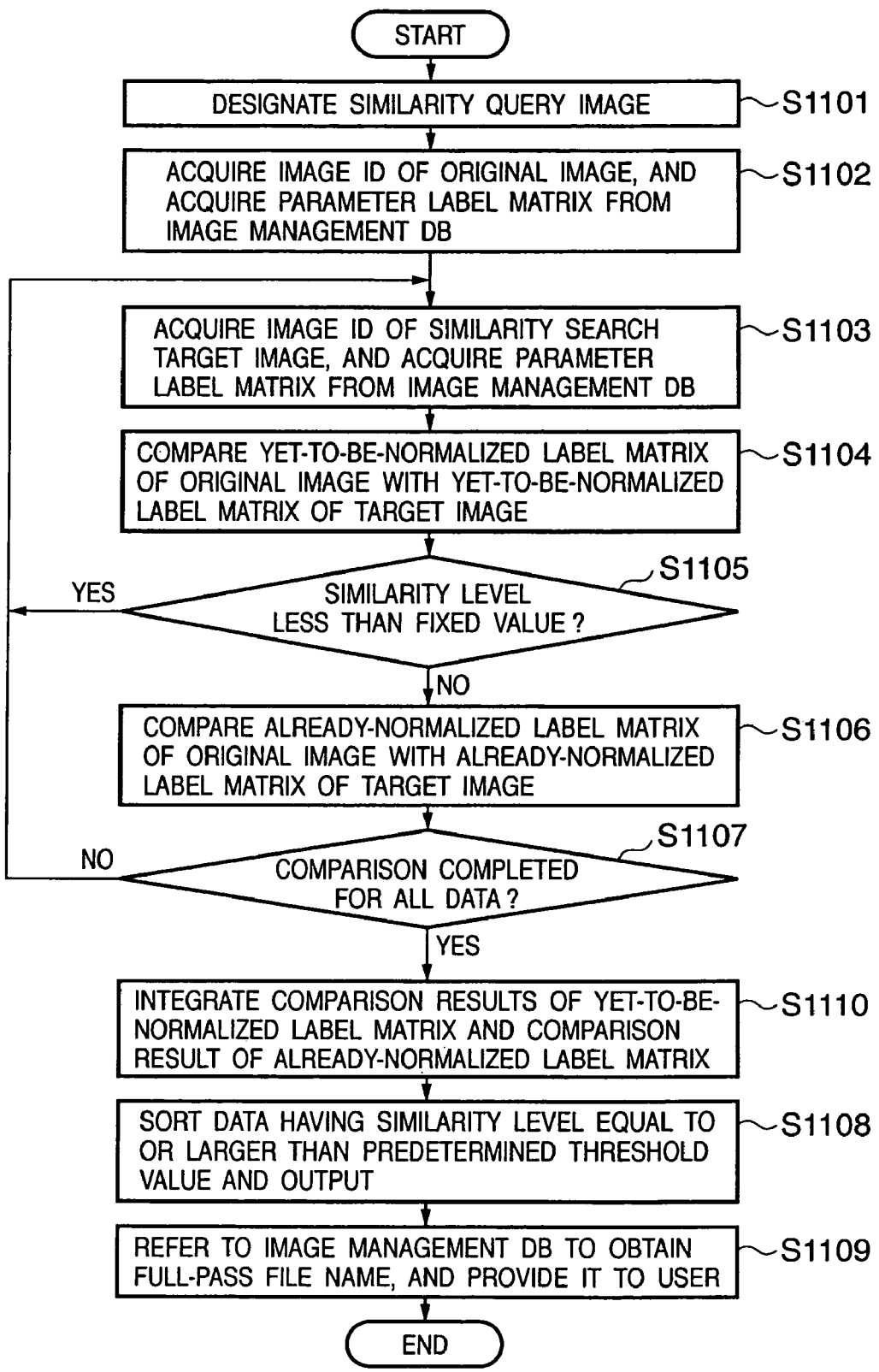
FIG. 15 is a flowchart describing a procedure of similar image retrieval processing performed by an image retrieving apparatus according to an embodiment of the present invention.

Next, similar image retrieval processing according to the second embodiment is described with reference to FIG. 15. The second embodiment differs from the first embodiment in that step S1110 is inserted between steps S1107 and S1108. Hereinafter step S1110 is described.

In step S1110, the similarity level obtained as a result of comparison between the yet-to-be-normalized label matrices and the similarity level obtained as a result of comparison between the already-normalized label matrices are integrated. Herein define that the former is expressed by Deg_before and the latter is expressed by Deg_after, and these similarity levels are expressed by values from 0 to 100. In this case, the integrated similarity level Deg_comb (0 to 100) can be expressed by the following conversion equation using a weight (0 to 1.0).

$$\text{Deg\_comb} = \text{Deg\_after} \times \left( \frac{(1 - \text{weight})}{100} \times \text{Deg\_before} + \text{weight} \right) \quad (2)$$

In conversion equation (2), the larger the weight, the higher the tolerance to image quality deterioration and color changes. At the same time, it increases the possibility of detecting an image originally having different colors. Contrary, the smaller the weight in conversion equation (2), the lower the tolerance to image quality deterioration and color changes. At the same time, it reduces the possibility of detecting an image originally having different colors. Note that the conversion equation is provided as an example of the present embodiment. Therefore, a conversion equation different from the above equation may be employed to integrate similarity levels. For another conversion equation, for instance, the following equation may be provided.

$$\text{Deg\_comb} = (1 - \text{weight}) \times \text{Deg\_before} + \text{weight} \times \text{Deg\_after} \quad (3)$$

In conversion equation (3), the larger the weight, the higher the tolerance to image quality deterioration and color changes. At the same time, it increases the possibility of detecting an image originally having different colors. Contrary, the smaller the weight in conversion equation (3), the lower the tolerance to image quality deterioration and color changes. At the same time, it reduces the possibility of detecting an image originally having different colors.

Thereafter, step S1108 is performed in the similar manner to that of the first embodiment.

Third Embodiment

In a case where actual printing or scanning is performed, slight color difference occurs even in the portions having a same color in image data. Particularly in a case where the number of color tones used in an original image is small, if image normalization is performed with the same number of tones as that of the original image, a slight color difference that exists in the portion having a same color is exaggerated, resulting in unintentional contrast data.

Therefore, in the present embodiment, image normalization is performed with the number of tones smaller than that of the original image. As a result, even if there is a slight color difference in the portions having a same color, equivalent processing is performed and it is possible to suppress the exaggeration of unintentional contrast data.

<Image Registration Processing>

Hereinafter, a description is provided on part of the image registration processing that is different from the first embodiment. In the present embodiment, the following procedure is executed to perform histogram equalization.

First, a histogram Hist (i) (i=0, 1, 2, . . . , 255) of an image before conversion is generated. Then, an occurrence frequency of a pixel value i is stored in Hist (i). At the same time, the sum (SUM) of the densities of all pixels is calculated. Although the present embodiment assumes that the number of tones of an image is 256 tones with respect to each color component, it is not limited to this. Further, in L*a*b* color space, the number of tones differs for each component. Therefore, when the number of tones used is different, values which will be used in the following description are changed accordingly.

Figure 14A:
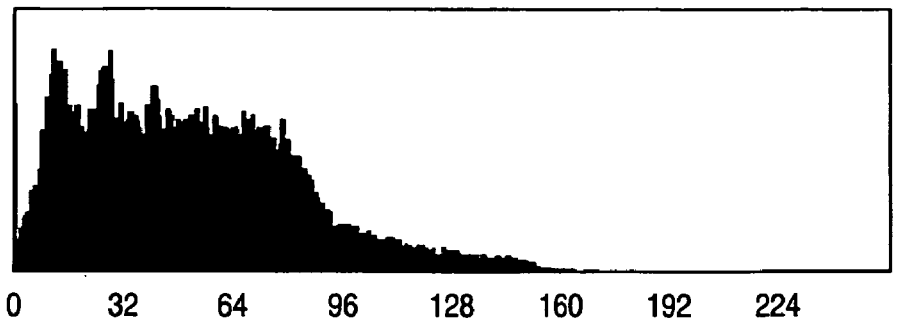
FIGS. 14A to 14C are explanatory views of histogram equalization processing in an image retrieving apparatus according to an embodiment of the present invention.
Figure 14B:
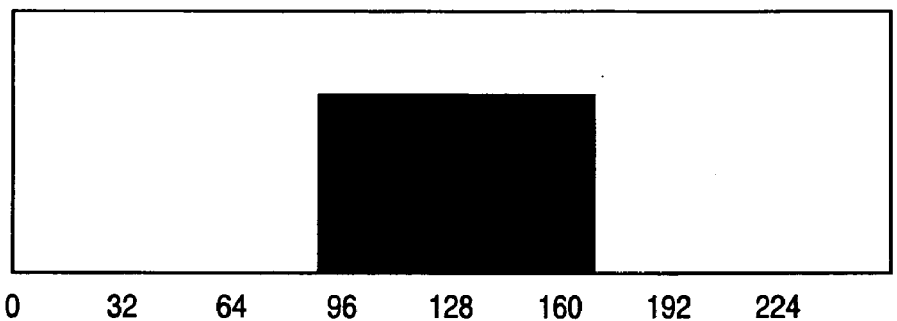
Figure 14C:
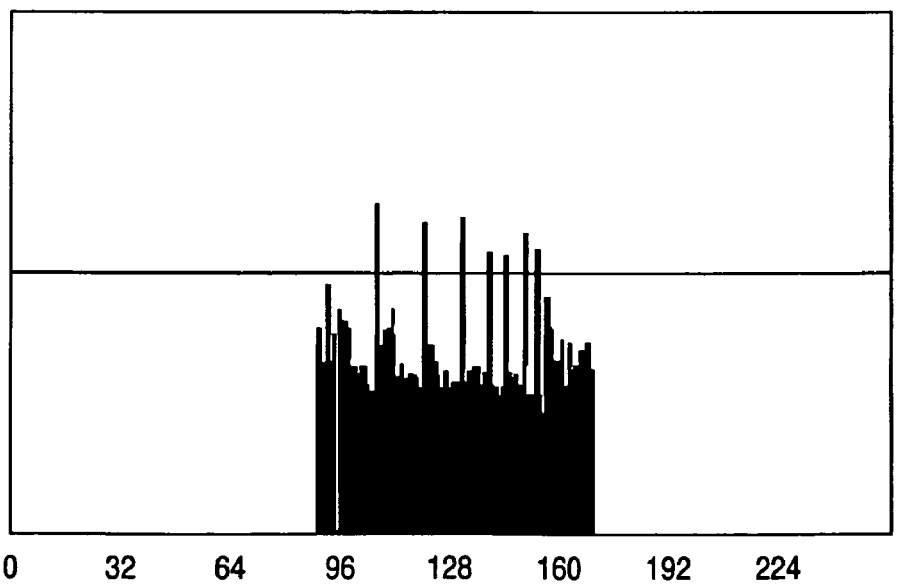

FIGS. 14A to 14C are explanatory views of histogram equalization processing in an image retrieving apparatus according to an embodiment of the present invention. FIG. 14A shows Hist (i) in a graph.

Next, the number of tones (HistWidth) where the pixel value i is not 0 is counted. To obtain HistWidth, the present embodiment counts the number of tones where the pixel value i is not 0. However, other methods may be employed. For instance, a highlight value and a shadow value may be obtained similarly to the above-described highlight/shadow processing, and the width of these values may be adopted as HistWidth.

Next, the HistWidth is multiplied by a predetermined ratio HistWidthRatio to obtain the number of tones EqHistWidth. With EqHistWidth, a histogram where occurrence frequencies of densities are substantially uniform is generated. Although the present embodiment assumes that HistWidthRatio is 50%, it is not limited to this. Further, a range of tones in the original image to which EqHistWidth is to be applied is determined, and the minimum point and the maximum point are respectively defined as EqHistMin and EqHistMax. To determine the range to which EqHistWidth is to be applied, there are a number of methods: the central point or barycenter point of tones of the original image is matched to the center of EqHistWidth; the central point of the color space employed is matched to the center of EqHistWidth, and the like.

To perform equalization of a histogram, a conversion table Conv3 (i) (i=0, 1, 2 . . . , 255) is generated.

In this processing, occurrence frequencies are added sequentially from Hist (0). Defining that i obtained when the sum exceeds Sum/EqHistWidth is k1, the values from Conv3 (0) to Conv3 (k1) are obtained as k1+EqHistMin. Next, occurrence frequencies are added sequentially from Hist (k1+1). Defining that i obtained when the sum exceeds Sum/EqHistWidth is k2, the values from Conv3 (k1+1) to Conv3 (k2) are obtained as k2+EqHistMin. In the similar manner, calculation is performed up to Conv3 (255).

Finally, all pixels of the image data are converted using the conversion table Conv3 (i). The ideal shape of the histogram after equalization is shown in FIG. 14B. However, in reality, the graph does not completely become flat, but normally has a shape like the graph shown in FIG. 14C.

Thereafter, an already-normalized image feature amount is extracted as similar to the first embodiment.

<Similar Image Retrieval Processing>

Similar image retrieval processing according to the present embodiment is similar to the processing of the first embodiment or the second embodiment.

As has been set forth above, according to the present embodiment, it is possible to suitably execute image retrieval that is tolerant to image quality deterioration and color changes. In particular, it is possible to retrieve original image data based on image data where colors and densities have changed upon scanning printed image data, or based on image data where tones of the shadow and highlight portions are not accurately reproduced and where black portions are whitish or white portions are blackish.

Note although the above embodiments have described an example of retrieving photograph images, the present invention is also applicable to retrieval of artificial images, e.g., CG, CAD and so on. Further, in the above embodiments, although color data is selected as an image feature amount, the present invention is not limited to this, and can be realized by obtaining another image parameter for each divided region of an image. Moreover, although the above embodiments have described an example where an image search is executed based on one feature amount, it is also possible to perform high-speed image search based on plural feature amounts by performing logical operation of search results obtained by an additional feature amount.

In a case where an image search is performed with respect to one image data using plural image feature amounts, the similarity level obtained by the present invention may be regarded as one new image feature amount, and multivariate analysis using plural parameters may be performed to execute a search using a statistical distance measure. Furthermore, although the above embodiments acquire, as a search result, similar images having a similarity level that exceeds a predetermined value, needless to say the apparatus may output a specified number of images as a search result in descending order of similarity levels.

The above description provides preferred embodiments of the present invention. The present invention can be realized in various implementation forms, e.g., a system, an apparatus, a method, a program, a storage medium (recording medium) and the like. More specifically, the invention can be applied to a system constituted by a plurality of devices or to a stand-alone apparatus.

Note, in the present invention, a software program realizing the functions of the above-described embodiments (program corresponding to the flowcharts in the drawings of the embodiments) is directly or remotely supplied to a system or apparatus. The present invention includes a case where the functions of the invention are achieved by reading the supplied program codes with a computer of the system or apparatus and executing them.

To realize the functions of the present invention by a computer, the program codes installed in the computer also constitute the present invention. In other words, the present invention includes the computer program itself for realizing the functions of the present invention.

In this case, as long as the function of the program is served, any form such as object codes, a program executed by an interpreter, script data supplied to an OS and the like may be taken.

For a recording medium to supply a program, for instance the following medium may be used: a floppy disk (registered trademark), a hard disk, an optical disk, a magneto-optical disk, MO, CD-ROM, CD-R, CD-RW, a magnetic tape, a non-volatile memory card, ROM, and DVD (DVD-ROM, DVD-R).

Besides the above, to supply a program, the program may be downloaded from a homepage on the Internet to a recording medium such as a hard disk using a browser of a client computer. More specifically, the client computer accesses a homepage and downloads a computer program itself of the present invention or a compressed file including an automatic installation function from the homepage. In addition, program codes constituting the program according to the present invention may be divided to plural files, and each of the files may be downloaded from different homepages. In other words, the present invention includes a WWW server which allows plural users to download the program file realizing the functions of the present invention on a computer.

Furthermore, a program according to the present invention may be enciphered and stored in a storage medium such as CD-ROM to be distributed to users. A user who satisfies a predetermined condition is allowed to download key data from a homepage on the Internet for deciphering the encryption. With the use of the key data, the enciphered program is executed and installed in a computer.

Furthermore, the functions of the above embodiments are realized by executing a program read by a computer. In addition, the functions of the above embodiments can also be realized in a case where an OS (operating system) or the like working on a computer performs part or the entire processes in accordance with designations of the program and implements processing.

Furthermore, the present invention also includes a case where, after the program read from the recording medium is written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Applications No. 2005-164865 filed on Jun. 3, 2005, and 2006-068273 filed on Mar. 13, 2006, which are hereby incorporated by reference herein in their entirety.

What is claimed is:

1. An image retrieving apparatus comprising:
   an input unit that inputs an image;
   a normalization unit that generates a normalized image by normalizing pixel values of said image;
   a generation unit that generates a feature amount matrix by dividing the normalized image into plural regions and extracting a feature amount in units of region;
   a storage unit that stores the feature amount matrix and said image in association with each other;
   a designation unit that designates a query image;
   a determination unit that determines a similarity level between a feature amount matrix of the query image and a feature amount matrix of said image stored in said storage unit; and
   a retrieval unit that retrieves an image, which is determined to be similar by said determination unit, as a similar image of the query image.

2. The image retrieving apparatus according to claim 1, further comprising a generation unit that generates a yet-to-be-normalized image feature amount matrix by dividing the image into two or more regions and extracting a yet-to-be-normalized image feature amount in units of region,
   wherein said storage unit stores, along with said feature amount matrix, the yet-to-be-normalized image feature amount matrix in association with said image, and
   said determination unit compares the yet-to-be-normalized image feature amount matrix of the query image with the yet-to-be-normalized image feature amount matrix of said image stored in said storage unit, and in a case where a difference between the yet-to-be-normalized image feature amount matrix of the query image and the yet-to-be-normalized image feature amount matrix of said image is less than a specified value, said determination unit determines a similarity level between the feature amount matrix of the query image and the feature amount matrix of said image.

3. The image retrieving apparatus according to claim 2, wherein said determination unit compares the yet-to-be-normalized image feature amount matrix of the query image with the yet-to-be-normalized image feature amount matrix of said image stored in said storage unit, and in a case where a difference between the yet-to-be-normalized image feature amount matrix of the query image and the yet-to-be-normalized image feature amount matrix of said image is equal to or larger than a specified value, said determination unit determines that said image is not similar to the query image.

4. The image retrieving apparatus according to claim 1, further comprising:
   a first color space conversion unit that converts said image to first color space in a case where color space of said image is different from first color space;
   a highlight value setting unit that sets, as a highlight value for each component of the first color space, a data value obtained when a first rate is exceeded from a largest side of data values;
   a shadow value setting unit that sets, as a shadow value for each component of the first color space, a data value obtained when a second rate is exceeded from a smallest side of data values; and
   an image conversion unit that converts said image using the highlight value and the shadow value.

5. The image retrieving apparatus according to claim 1, further comprising a second color space conversion unit that converts said image to second color space in a case where color space of said image is different from second color space,
   wherein said normalization unit generates a normalized image for each component of the second color space, said normalized image normalized in a way that average values of all pixels are uniformized.

6. The image retrieving apparatus according to claim 1, further comprising a second color space conversion unit that converts said image to second color space in a case where color space of said image is different from second color space,
   wherein said normalization unit generates a normalized image for each component of the second color space, said normalized image normalized in an area of tones smaller than the number of tones of the component.

7. The image retrieving apparatus according to claim 6, further comprising a counting unit that counts an occurrence frequency of each component of said image that has been converted by said color space conversion unit,
   wherein said normalization unit decides the area of tones based on a counted number of the occurrence frequency that is not 0, counted by said counting unit.

8. The image retrieving apparatus according to claim 6, further comprising a counting unit that counts an occurrence frequency of each component of said image that has been converted by said color space conversion unit,
   wherein said normalization unit decides the area of tones based on a maximum value and a minimum value of the occurrence frequency that are not 0, counted by said counting unit.

9. The image retrieving apparatus according to claim 6, wherein said normalization unit makes a central point of the area of tones match a central point of tones of the first color space.

10. The image retrieving apparatus according to claim 6, wherein said normalization unit makes a central point of the area of tones match a central point or a barycenter of a histogram of said image.

11. The image retrieving apparatus according to claim 1, further comprising an enlargement/reduction unit that enlarges or reduces said image inputted by said input unit to a specified size,
    wherein said normalization unit generates a normalized image of said image that has been enlarged or reduced by said enlargement/reduction unit.

12. The image retrieving apparatus according to claim 1, in a case where sizes are different in the feature amount matrix of the query image and the feature amount matrix of said image stored in said storage unit, further comprising a feature amount matrix enlargement/reduction unit that uniformizes the sizes of both feature amount matrices by enlarging or reducing one of the feature amount matrices.

13. The image retrieving apparatus according to claim 1, wherein said normalization unit normalizes said image by using at least one of the following methods in first color space: shifting a pixel value, scaling a pixel value, or planarizing a histogram.

14. An image retrieving apparatus comprising:
    an input unit that inputs an image;
    a first generation unit that generates a first feature amount matrix by dividing said image into two or more regions and extracting a feature amount in units of region;
    a normalization unit that generates a normalized image by normalizing pixel values of said image;

a second generation unit that generates a second feature amount matrix by dividing the normalized image into plural regions and extracting a feature amount in units of region;

a storage unit that stores the first and second feature amount matrices and said image in association with each other;

a designation unit that designates a query image;

a first determination unit that determines a first similarity level between a first feature amount matrix of the query image and a first feature amount matrix of said image stored in said storage unit;

a second determination unit that determines a second similarity level between a second feature amount matrix of the query image and a second feature amount matrix of said image stored in said storage unit;

a similarity level integration unit that integrates the first and second similarity levels; and a retrieval unit that retrieves a similar image of the query image based on a similarity level integrated by said similarity level integration unit.

15. An image retrieving method comprising:

an input step of inputting an image;

a normalization step of generating a normalized image by normalizing pixel values of said image;

a generation step of generating a feature amount matrix by dividing the normalized image to plural regions and extracting a feature amount in units of region;

a storage step of storing the feature amount matrix and said image in a storage device in association with each other;

a designation step of designating a query image;

a determination step of determining a similarity level between a feature amount matrix of the query image and a feature amount matrix of said image stored in the storage device; and a retrieval step of retrieving an image, which is determined to be similar in said determination step, as a similar image of the query image.

16. An image retrieving method comprising:

an input step of inputting an image;

a first generation step of generating a first feature amount matrix by dividing said image into two or more regions and extracting a feature amount in units of region;

a normalization step of generating a normalized image by normalizing pixel values of said image;

a second generation step of generating a second feature amount matrix by dividing the normalized image into plural regions and extracting a feature amount in units of region;

a storage step of storing the first and second feature amount matrices and said image in a storage device in association with each other;

a designation step of designating a query image;

a first determination step of determining a first similarity level between a first feature amount matrix of the query image and a first feature amount matrix of said image stored in the storage device;

a second determination step of determining a second similarity level between a second feature amount matrix of the query image and a second feature amount matrix of said image stored in the storage device;

a similarity level integration step of integrating the first and second similarity levels; and a retrieval step of retrieving a similar image of the query image based on a similarity level integrated in said similarity level integration step.

17. A computer-readable storage medium on which is stored computer-readable process steps for causing a computer to execute:

an input procedure of inputting an image;

a normalization procedure of generating a normalized image by normalizing pixel values of said image;

a generation procedure of generating a feature amount matrix by dividing the normalized image into plural regions and extracting a feature amount in units of region;

a storage procedure of storing the feature amount matrix and said image in a storage device in association with each other;

a designation procedure of designating a query image;

a determination procedure of determining a similarity level between a feature amount matrix of the query image and a feature amount matrix of said image stored in the storage device; and a retrieval procedure of retrieving an image, which is determined to be similar in said determination procedure, as a similar image of the query image.

18. A computer-readable storage medium on which is stored computer-readable process steps for causing a computer to execute:

an input procedure of inputting an image;

a first generation procedure of generating a first feature amount matrix by dividing said image into one or more regions and extracting a feature amount in units of region;

a normalization procedure of generating a normalized image by normalizing pixel values of said image;

a second generation procedure of generating a second feature amount matrix by dividing the normalized image into plural regions and extracting a feature amount in units of region;

a storage procedure of storing the first and second feature amount matrices and said image in a storage device in association with each other;

a designation procedure of designating a query image;

a first determination procedure of determining a first similarity level between a first feature amount matrix of the query image and a first feature amount matrix of said image stored in the storage device;

a second determination procedure of determining a second similarity level between a second feature amount matrix of the query image and a second feature amount matrix of said image stored in the storage device;

a similarity level integration procedure of integrating the first and second similarity levels; and a retrieval procedure of retrieving a similar image of the query image based on a similarity level integrated in said similarity level integration procedure.

* * * * *